(12) United States Patent
Sweezey

(10) Patent No.: US 6,394,732 B1
(45) Date of Patent: May 28, 2002

(54) BALE HANDLING DEVICE

(76) Inventor: Darrell Sweezey, P.O. Box 8031, Edson, Alberta (CA), T7E 1W2

( * ) Notice: Subject to any disclaimer, the term of this patent is extended or adjusted under 35 U.S.C. 154(b) by 0 days.

(21) Appl. No.: 09/690,695

(22) Filed: Oct. 17, 2000

(30) Foreign Application Priority Data

Jul. 6, 2000 (CA) .............................................. 2312611

(51) Int. Cl.⁷ ............................................... A01D 90/10
(52) U.S. Cl. ..................... 414/24.6; 414/24.5; 414/223; 414/226; 414/555
(58) Field of Search ............................... 414/24.5, 24.6, 414/222, 223, 226, 910, 911, 908, 546, 547, 555, 684

(56) References Cited

U.S. PATENT DOCUMENTS

| | | | |
|---|---|---|---|
| 3,877,595 A | | 4/1975 | Edelman |
| 3,908,846 A | | 9/1975 | Brummitt |
| 3,946,887 A | | 3/1976 | Parker |
| 3,958,772 A | | 5/1976 | Hynson |
| 3,968,940 A | | 7/1976 | Godberson |
| 4,032,184 A | | 6/1977 | Blair |
| 4,044,963 A | | 8/1977 | Hostetler |
| 4,049,140 A | | 9/1977 | Roose |
| 4,082,192 A | | 4/1978 | Cox |
| 4,090,624 A | | 5/1978 | Krein et al. |
| 4,148,399 A | | 4/1979 | Carter et al. |
| 4,288,191 A | * | 9/1981 | Lynch ........................ 414/24.5 |
| 4,298,301 A | | 11/1981 | Carter et al. |
| 4,364,701 A | * | 12/1982 | Lynch et al. ................ 414/24.6 |
| 4,594,041 A | * | 6/1986 | Hostetler ................... 414/24.5 |
| 4,722,651 A | * | 2/1988 | Antal ........................ 414/24.5 |
| 4,952,111 A | | 8/1990 | Callahan |
| 5,082,413 A | | 1/1992 | Grosz et al. |
| 5,397,208 A | | 3/1995 | Siebenga |
| 5,507,612 A | | 4/1996 | Siebenga |
| 5,509,770 A | | 4/1996 | Burenga |
| 5,603,597 A | * | 2/1997 | Clay, Sr. .................... 414/24.5 |
| 5,938,392 A | | 8/1999 | Duck |

FOREIGN PATENT DOCUMENTS

| | | | | |
|---|---|---|---|---|
| CA | 902554 | | 6/1972 | |
| CA | 1062668 | | 9/1979 | |
| CA | 1142139 | | 1/1983 | |
| CA | 1157433 | | 11/1983 | |
| CA | 1256406 | | 6/1989 | |
| DE | 19704917 | | 9/1998 | |
| GB | 2136392 A | * | 9/1984 | ................ 414/24.6 |
| GB | 2218396 | * | 11/1989 | ................ 414/24.5 |

* cited by examiner

*Primary Examiner*—Joseph A. Fischetti
(74) *Attorney, Agent, or Firm*—Rodman & Rodman

(57) ABSTRACT

A bale handling device including a bale frame and and an attachment mechanism for attaching the device to a vehicle such that the bale frame can be raised and lowered. The bale frame includes a support beam as a primary bale support, a pair of arms connected with the support beam, and a pair of bale engaging members connected with the arms as a secondary bale support. The secondary bale support is located relative to the primary bale support such that when a bale is positioned within the bale frame and lifted by the device it is supported by both the primary bale support and the secondary bale support and its center of gravity is located between the primary bale support and the secondary bale support.

4 Claims, 3 Drawing Sheets

BALE HANDLING DEVICE

FIELD OF INVENTION

The present invention relates to a bale handling device used to transport hay bales from the field to the storage yard and to unroll the haybales for feeding livestock.

BACKGROUND OF INVENTION

Previous art describes various apparatus for lifting, transporting and unrolling cylindrical hay bales.

U.S. Pat. No. 4,032,184 issued on Jun. 28, 1977 to Calvin B. Blair describes a round bale loader attachment with forwardly extending parallel arms mounted for pivotal movement about their longitudinal axes permitting a semi-cradling of the bales. The bale is supported solely by being cradled in the parallel arms.

U.S. Pat. No. 4,049,140 issued on Sep. 20, 1977 to Gerald L. Roose describes a bale carrying and unrolling device for use with a three-point hitch. A horizontal cross bar frame has a pair of rearwardly extending arms pivotally mounted on the ends of the cross bar frame. The extending arms pivot and laterally adjust to vary the width of the space between the arms. The outer ends of the arms have inwardly directed tines on a circular gripping plate. The arms are pivoted out for releasing the hay bale by a hydraulic cylinder pivotally connected to one arm. The bale is supported solely by the inwardly directed tines.

U.S. Pat. No. 4,090,624 issued on May 23, 1978 to Vernon R. Krein and Lawrence D. Elmer describes an apparatus for transporting and unrolling cylindrical bales of hay including a frame mounted in the box of a pickup truck or on its own wheels. The apparatus has a pair of pivoting arms with pressure plates to grasp and release the bale axially. The bale is supported solely by the pressure plates.

Canadian Patent No. CA 1157433 issued on Nov. 22, 1983 to Kenneth G. Knight describes an apparatus to unroll round hay bales comprised of a frame with one fixed arm extending perpendicularly from one side of the frame and a hinged arm extending from the other side. Each arm has a bale engaging spike or prong which pierces the axis of the bale. The frame is attached to a three-point hitch. The hitch allows the bale to be elevated to clear the ground. To unroll the bale, the hitch is placed in the float position, the tractor moves forward and the bale rotates on the prongs and unrolls. The bale is supported solely by the bale engaging spikes.

U.S. Pat. No. 5,509,770 issued on Apr. 23, 1996 to Thomas I. Burenga describes a hay handler and unroller apparatus with an improved clamp and bracket design to handle a wide range of bale lengths. A linear frame has pivoting clamp arms at its ends held by brackets and a mount for a three-point hitch in the middle. The clamp arms are reversible to provide for three possible ways to assemble the clamp arms and brackets to the frame. A pair of securing devices are attached at the frontal ends of the clamp arms to secure the bale of hay between the clamp arms. The bale is supported solely by the securing devices.

U.S. Pat. No. 5,938,392 issued Aug. 17, 1999 to Bernie H. Duck describes a spooled hay dispenser apparatus for unrolling spooled hay from a tractor. An upright locking bracket lets the operator pick up a roll of hay at the storage area, carry it to the feeding area and unroll it. The apparatus provides a slotted tube at the ends of and perpendicular to a cross bar for rotatably mounting spikes which hold a cylindrical hay bale. The bracket on the cross bar maintains the arms horizontally when the bale is almost completely unrolled to prevent gouging the ground surface. The bale is supported solely by the spikes.

U.S. Pat. No. 4,594,041 issued on Jun. 10, 1986 to Dewey L. Hostetler describes a bale lift assembly for a flat bed truck with a pair of hugger arms which grip the hay bale and which rotate through an arc to lift round hay bales onto a flat bed truck. The bale is supported solely by teeth which are mounted on the hugger arms.

U.S. Pat. No. 5,082,413 issued on Jan. 21, 1992 to Clifford C. Grosz, Harvey N. Dak, Jeffrey Schilling and Martin N. Dak describes an apparatus for carrying hay bales for attachment to a front end loader, including a support frame with forwardly extending support arms for supporting a bale from underneath and forwardly extending gripping arms. The bale is supported from underneath by the support arms and on the sides by the gripping arms.

There remains a need for a simple bale handling device which is capable of carrying a cylindrical bale while supporting the bale on either side of its center of gravity.

SUMMARY OF INVENTION

The present invention relates to a simple apparatus to transport cylindrical hay bales around the farm. Preferably the apparatus may also be used to unroll bales for feeding livestock.

More particularly, the invention relates to a simple apparatus in which a bale is supported by a primary bale support on one side of its centre of gravity and by a secondary bale support on the other side of its centre of gravity.

More particularly, the invention relates to a bale handling device, the device comprising:
(a) a support beam, the support beam comprising a primary bale support, the support beam defining a closed end of a bale frame;
(b) a first arm connected with the support beam, the first arm defining a first side of the bale frame;
(c) a second arm connected with the support beam, the second arm defining a second side of the bale frame;
(d) a first bale engaging member connected with the first arm and projecting within the bale frame;
(e) a second bale engaging member connected with the second arm and projecting within the bale frame;
(f) an attachment mechanism for attaching the device to a vehicle such that the bale frame can be raised and lowered;

wherein the first bale engaging member and the second bale engaging member together comprise a secondary bale support and wherein the secondary bale support is located relative to the primary bale support such that when a bale is positioned within the bale frame a center of gravity of the bale is located between the primary bale support and the secondary bale support and such that when the bale frame is thereafter lifted the bale will be supported by both the primary bale support and the secondary bale support.

Preferably the first bale engaging member and the second bale engaging member are movable toward and away from each other to facilitate gripping and release of a bale. Any structure, apparatus or mechanism may be used to achieve this relative movement between the first bale engaging member and the second bale engaging member. For example, one or both of the first arm and the second arm may pivot relative to the support beam, or one or both of the bale engaging members themselves may extend and retract relative to the first arm and the second arm.

Preferably at least one of the first arm and the second arm is slidably connected with the support beam so that the first bale engaging member and the second bale engaging member are movable toward and away from each other while maintaining the first arm and the second arm substantially parallel to each other. In the preferred embodiment both of the arms are slidably connected with the support beam so that both of the arms are movable.

The arms may be slidably connected with the support beam in any manner. For example, the arms may be retained in grooves or slots in the support beam. Preferably, however, the arms are telescopically connected with the support beam.

The movement of the first bale engaging member and the second bale engaging member toward and away from each other may be controlled in any manner which is compatible with the particular mechanism selected for achieving this result. For example, the movement of the arms or the bale engaging members may be controlled manually or may be controlled pneumatically, hydraulically or electrically.

Preferably the movement of the first arm relative to the second arm is controlled hydraulically by at least one hydraulic cylinder associated with at least one of the arms.

In the preferred embodiment, both of the first arm and the second arm are slidably connected with the support beam and movement of the first bale engaging member and the second bale engaging member toward and away from each other is controlled by a first hydraulic cylinder associated with the first arm and a second hydraulic cylinder associated with the second arm.

Preferably the support beam is comprised of a hollow beam member, wherein the first arm is comprised of a first arm connecting member, wherein the second arm is comprised of a second arm connecting member, and wherein the first arm connecting member and the second arm connecting member are telescopically received within the hollow beam member.

Preferably the device is further comprised of wear strip material positioned between the first arm connecting member and the hollow beam member and positioned between the second arm connecting member and the hollow beam member. Preferably the wear strip material is replaceable in order to extend the life of the connecting members and the hollow beam member.

The attachment mechanism may be comprised of any structure, apparatus or mechanism which will facilitate raising and lowereing of the bale frame. Preferably the attachment mechanism is associated with the support beam. Preferably the attachment mechanism is adapted for attachment of the device to a hitch on a vehicle, which may either be self-propelled or towed.

In the preferred embodiment the attachment mechanism is adapted for attachment to a hitch which can be raised or lowered, such as a three point hitch of the type commonly found on tractors and other farm equipment.

The bale engaging members may be comprised of any structure, apparatus or mechanism which will engage a bale and thus function as the secondary bale support. For example, the bale engaging members may be comprised of teeth or some other surface on the first and second arms.

The bale engaging members may be connected at any location on the arms and may extend along all or a portion of the length of the arms. Preferably the bale engaging members are located at distal ends of the arms relative to the points of connection of the arms to the support beam.

In the preferred embodiment the first bale engaging member is comprised of a first bale piercing spear and the second bale engaging comprised of a second bale piercing spear. The bale piercing spears may be fixedly connected with the arms or they may be rotatably connected with the arms. In the preferred embodiment the first bale piercing spear is fixedly connected with the first arm and the second bale piercing spear is fixedly connected with the second arm.

The support beam may be comprised of any structure which will facilitate connection of the arms thereto and which will function as the primary bale support. For example, the support beam may be comprised of a member of any shape, including in the preferred embodiment a simple hollow beam member. The primary bale support may therefore be comprised of an exterior surface on the hollow beam member.

Preferably the exterior surface of the support beam is comprised of a planar primary support surface so that the primary bale support is comprised of the planar primary support surface. A planar primary support surface is preferred because it may serve to distribute the weight of a bale more effectively than a primary bale support comprised solely of an exterior surface on the support beam. The planar primary support surface may be comprised of a planar surface on the support beam, such as a planar exterior surface on a square hollow beam member.

In the preferred embodiment the planar primary support surface is comprised of a primary support plate. Preferably the primary support plate is connected with the support beam and preferably the primary support plate is centrally located on the support beam.

BRIEF DESCRIPTION OF DRAWINGS

Embodiments of the invention will now be described with reference to the accompanying drawings, in which.

DETAILED DESCRIPTION

Referring to FIGS. 1–4, there is depicted a bale handling device (20) for hay bales according to the preferred embodiment of the invention. The bale handling device (20) is preferably for use with cylindrical bales, but may also be used with bales of other shapes.

Figure 1A:
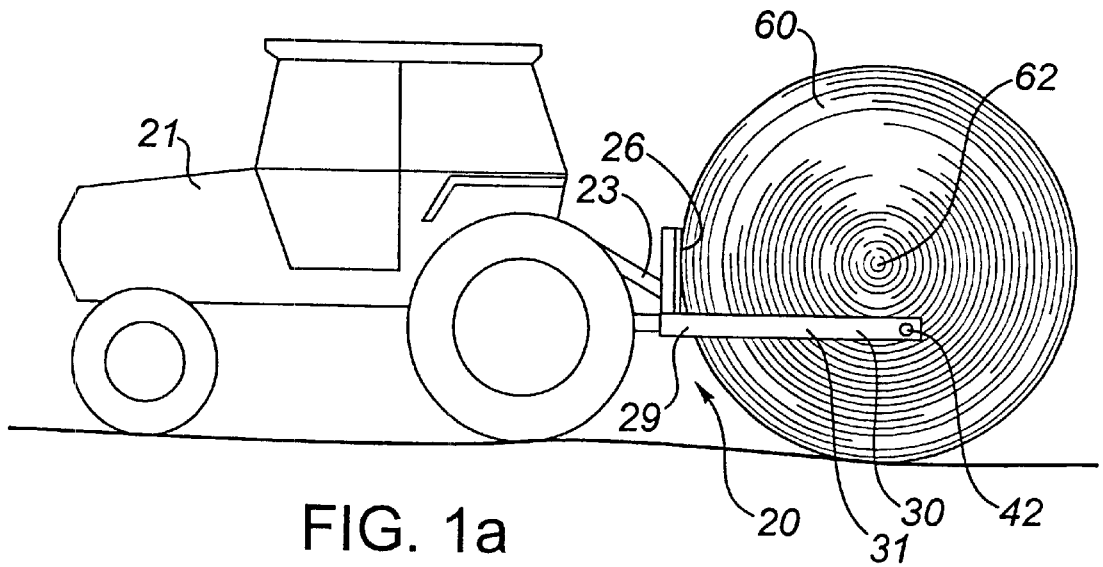
FIG. 1(a) is a side view of a bale handling device constructed in accordance with a preferred embodiment of the invention, mounted on a tractor with the bale frame in a lowered position.
Figure 1B:
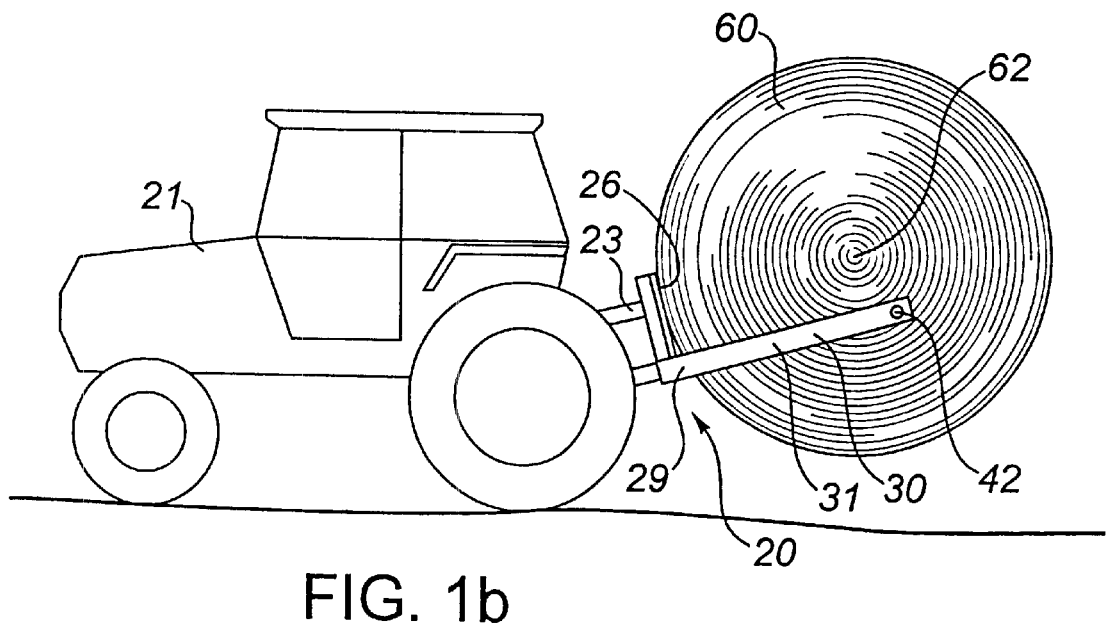
FIG. 1(b) is a side view of the bale handling device of FIG. 1(a), with the bale frame in a raised position.
Figure 2:
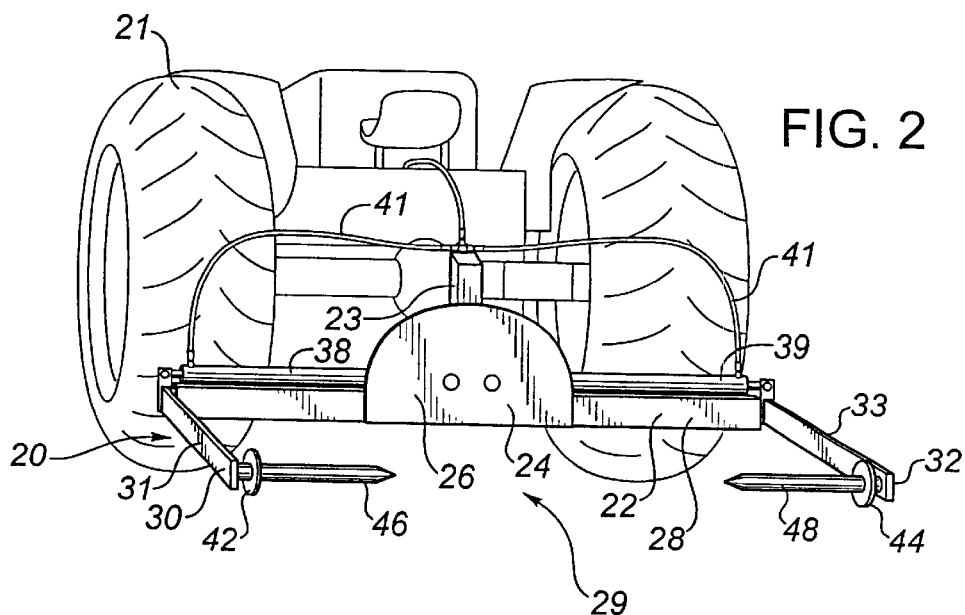
FIG. 2 is a pictorial view of the bale handling device of FIG. 1(a) with the bale engaging members positioned toward each other.

Referring to FIGS. 1 and 2, the bale handling device (20) is mounted on a tractor (21) and includes a support beam (22) comprising a primary bale support and bale engaging members (42,44) comprising a secondary bale support.

The bale handling device (20) may be used to transport and unroll cylindrical hay bales. In the preferred embodiment, the bale handling device (20) is intended for use to transport a cylindrical hay bale from the field to the storage yard on the farm and to unroll the bales for feeding livestock.

Referring to FIG. 2, in the preferred embodiment the bale handling device (20) is comprised of a support beam (22)

which includes a vertical support post (23) and is comprised of a planar primary support surface (24). The support beam (22) may be hollow or solid and may be constructed of a variety of cross-sections. Preferably the support post (23) is centrally located on the support beam (22).

In the preferred embodiment, the support beam (22) is hollow and is of square cross-section. In the preferred embodiment the planar primary support surface (24) comprises a primary support plate (26) and may also comprise the support post (23) and the planar exterior surface provided by the square support beam (22). The support beam (22) defines a closed end (28) of a bale frame (29).

The primary support plate (26) may be any shape and size and may be attached to the support beam (22) in any manner. Preferably the primary support plate (26) is centrally located on the support beam (22) and extends upward from the support beam (22) in front of the support post (23). In the preferred embodiment, the primary support plate (26) is semi-circular and is welded to the support beam (22).

In the preferred embodiment, the bale handling device (20) includes a first arm (30) connected to the support beam defining a first side (31) of the bale frame (29) and a second arm (32) connected to the support beam (22) defining a second side (33) of the bale frame (29).

The first arm (30) and the second arm (32) extend rearwardly from the support beam (22).

The first arm (30) and the second arm (32) may be hollow or solid, circular, square or rectangular, depending upon the manner in which they are to be connected with the support beam (22).

Figure 3:
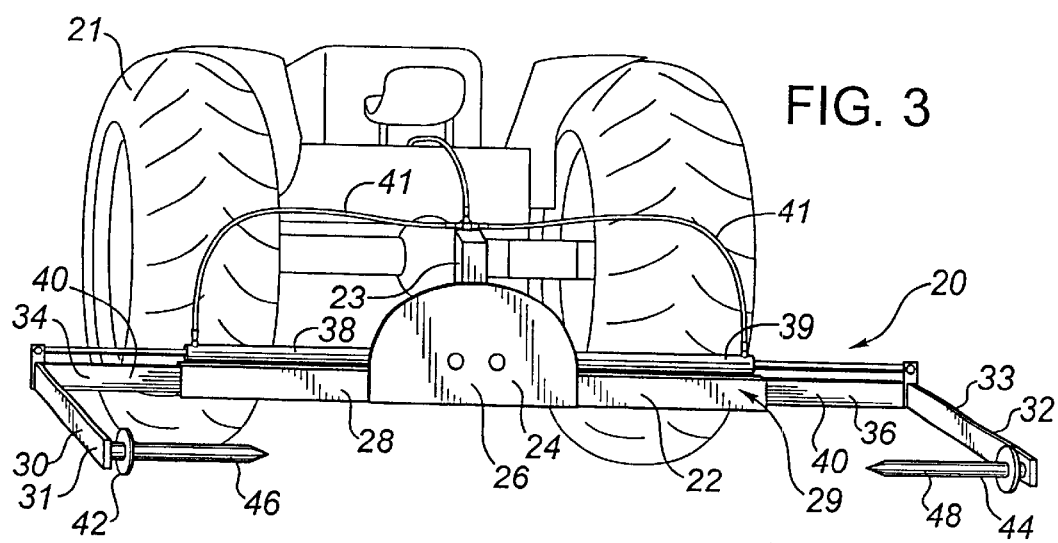
FIG. 3 is a pictorial view of a bale handling device of FIG. 2 with the bale engaging members positioned away from each other.
Figure 4:
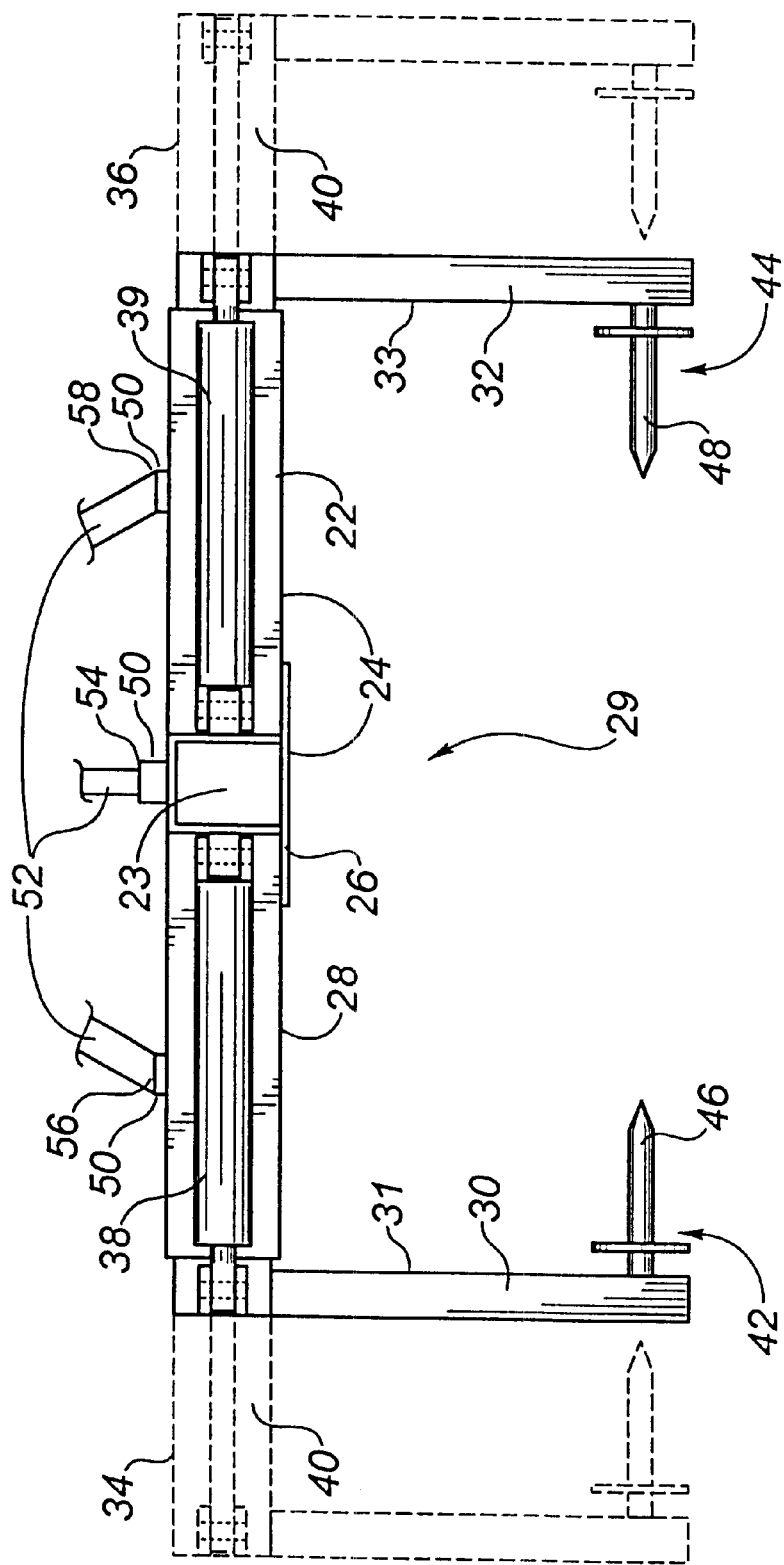
FIG. 4 is a plan view of the bale handling device of FIG. 1 showing the bale engaging members positioned toward each other in solid lines and positioned away from each other in broken lines.

Referring to FIGS. 3 and 4, in the preferred embodiment the first arm (30) and the second arm (32) are hollow and rectangular and are slidably connected with the support beam (22). The first arm (30) is comprised of a first arm connecting member (34) and the second arm (32) is comprised of a second arm connecting member (36). The first arm connecting member (34) and the second arm connecting member (36) are telescopically received within the hollow support beam (22).

The first arm (30) and the second arm (32) may alternatively be slidably connected to the support beam (22) by being retained in slots or grooves in the support beam (22) so that the arm connecting members (34,36) are not telescopically received in the support beam (22). The first arm (30) and the second arm (32) may also be pivotally connected with the support beam (22).

Referring to FIGS. 3 and 4, in the preferred embodiment the movement of the first arm (30) and the second arm (32) toward and away from each other is controlled by a pair of hydraulic cylinders. The first arm (30) is attached to a first hydraulic cylinder (38) and the second arm (32) is attached to a second hydraulic cylinder (39). The hydraulic cylinders (38,39) are attached to the support beam (22) and are actuated by a hydraulic system (41) which is associated with the tractor (21) or other vehicle. Wear strip material (40) is positioned at the interfaces between the first arm connecting member (34) and the support beam (22) and the second arm connecting member (36) and the support beam (22) to reduce wear on either the support beam (22) or the arm connecting members (34,36).

In the preferred embodiment the first bale engaging member (42) attached to a distal end of the first arm (30) and the second bale engaging member (44) is attached to a distal end of the second arm (32). The first bale engaging member (42) and the second bale engaging member (44) grasp the bale to provide the secondary bale support.

In the preferred embodiment, the first bale engaging member (42) is comprised of a first bale piercing spear (46) and the second bale engaging member is comprised of a second bale piercing spear (48). The first bale piercing spear (46) is fixedly connected by bolt or otherwise with the first arm (30). The second bale piercing spear (48) is fixedly connected by bolt or otherwise with the second arm (32).

In the preferred embodiment the attachment mechanism (50) is adapted for attachment to a three point hitch (52) of the type typically found on tractors and other farm implements. The attachment mechanism (50) in the preferred embodiment therefore comprises an upper attachment point (54) for an upper connection and two lower attachment points (56,58) for two lower connections. Upon actuation of the three point hitch (52), the bale handling device (20) will pivot about the lower attachment points (56,58) to raise or lower the bale frame (29).

In actual operation, the device may be used as follows. As depicted in FIGS. 1(a) and 1(b), the attachment mechanism (50) is attached to a three-point hitch (52) of the tractor (21) and the tractor (21) is moved rearwardly towards a bale (60). When the operator is ready to pick up the bale (60), the first and second hydraulic cylinders (38,39) are actuated to move the first arm (30) and the second arm (32) away from each other as indicated in FIG. 4.

The tractor (21) is then moved rearwardly until the bale (60) is positioned so that it abuts the closed end (28) of the bale frame (29) and is between the first arm (30) and the second arm (32). The hydraulic cylinders (38) are then actuated as depicted in FIG. 4 to move the first arm (30) and the second arm (32) towards each other until the first bale engaging member (42) and the second bale engaging member (44) pierce the bale (60) just past its center of gravity (62), so that the center of gravity (62) of the bale (60) is located horizontally between the bale engaging members (42,44) and the support beam (22).

The bale (60) can then be moved to an above ground position as depicted in FIG. 1(b) by actuating the three point hitch (52) so that the bale handling device (20) pivots about the lower attachment points (56,58) and the bale frame (29) becomes elevated.

On pivoting of the bale handling device (20) as shown in FIG. 1(b), the bale (60) will also pivot about the bale engaging members (42,44) in order to become firmly engaged against the primary support plate (26). This results in two desirable consequences which are achieved by the invention.

First, the bale (60) will be cradled between the primary support plate (26) as a primary bale support and the first and second bale engaging members (42,44) as a secondary bale support. The center of gravity (62) of the bale (60) will be located horizontally between the primary support plate (26) and the bale engaging members (42,44), and the bale (60) will therefore be quite stable. In addition, the bale (60) will not be supported solely by the bale engaging members (42,44), but instead will be supported at least in part by the primary support plate (26) and thus the bale frame (29).

Second, as a result of the center of gravity (62) of the bale (60) pivoting about the bale engaging members (42,44), the bale (60) will be urged toward the support beam (22) and the tractor (21), thus ensuring that the center of gravity (62) of the bale (60) will be as close as possible to the tractor (21). This in turn will result in the tractor (21) being more stable and less prone to lifting of its front wheels due to the weight of the bale (60).

Once it has been lifted, the bale (60) can then be moved with the tractor (21). When the bale (60) has reached its desired location, the three point hitch (52) may be actuated to lower the bale handling device (20) and thus lower the bale (60) to the ground. The hydraulic cylinders (38,39) may then be actuated to release the bale engaging members (42,44) and the tractor (21) can then be driven away, leaving the bale (60) behind.

Alternatively the bale handling device (20) may be used to unroll the bale (60) for the purpose of feeding livestock. In order to unroll a bale (60) using the bale handling device (20), the bale (60) is first lifted by the bale handling device (20) in the manner described above and then moved to a desired feeding location.

Once the bale (60) has reached the desired feeding location, the three point hitch (52) can be actuated to lower the bale (60) to the ground. The tractor (21) can then be driven forwards so that the bale (60) revolves in the bale frame (29) around the bale engaging members (42,44). As the bale (60) revolves it will unroll and become smaller. Preferably the three point hitch (52) will be equipped with a "floating" feature in which the three point hitch (52) will move downward automatically as the bale (60) unrolls to ensure that the bale (60) continues to engage the ground.

It will be apparent that one of the essential features of the invention is that the arms (30,32) and the bale engaging members (42,44) must be configured first, so that the bale engaging members (42,44) will grasp the bale (60) so that the center of gravity (62) of the bale (60) will be located between the support beam (22) and the bale engaging members (42,44) and second, so that the bale (60) will engage and be supported by the primary bale support once it is lifted with the three point hitch (52).

However, if the bale handling device (20) is to be used to unroll bales, it should also be noted that the arms (30,32) and the bale engaging members (42,44) must also be configured so that the bale (60) can rotate about the bale engaging members (42,44) without being prevented from doing so by the primary bale support. As a result, if the bale handling device (20) is to be used for unrolling bales, the arms (30,32) and the bale engaging members (42,44) should be configured so that the bale (60) can be supported by both the primary bale support and the secondary bale support and yet be unrolled without becoming wedged against the primary bale support.

As a result, the arms (30,32) and the bale engaging members (42,44) are configured in the invention to be compatible with the size of the bale (60). The horizontal distance between the support beam (22) and the bale engaging members (42,44) should be slightly greater than the "radius" of the bale (60) to ensure that the horizontal position of the center of gravity (62) of the bale (60) will be located between the support beam (22) and the bale engaging members (42,44). In addition, a straight line between the primary bale support (the support beam (22)) and the secondary bale support (the bale engaging members (42,44)) should pass below a parallel line representing the "diameter" of the bale (60) to ensure that the bale (60) will be supported by the primary bale support and the secondary bale support when the bale (60) with the bale handling device (20).

It should be noted that although the bale handling device is preferably used with cylindrical bales, it may also be used with bales of different shapes, in which case the terms "radius" and "diameter" will refer to the corresponding dimension in the different shape.

In the preferred embodiment the bale handling device (20) is constructed to achieve this result for a particular size of bale (60) by providing a fixed length for the arms (30,32) and a fixed position on the arms (30,32) of the bale engaging members (42,44). The bale handling device (20) may, however, be constructed with variable length arms (30,32) and/or with adjustable bale engaging members (42,44).

Similarly, in the preferred embodiment the bale handling device (20) is constructed to provide for a standard height of the bale frame (29) prior to actuation of the three point hitch to lift the bale (60). The bale handling device (20) could, however, be constructed to provide for a height adjustment feature that will accommodate bales (60) with varying dimensions.

The embodiments of the invention in which an exclusive property or privilege is claimed are defined as follows:

1. A bale handling device, the device comprising:
   (a) a support beam defining a closed end of a bale frame, the support beam comprising a primary bale support, the primary bale support comprising:
      (i) a hollow beam member;
      (ii) a vertical support post connected to the hollow beam member and centrally located on the hollow beam member; and
      (iii) a primary support plate connected to the hollow beam member and connected to the support post, the primary support plate being centrally located on the hollow beam member and extending upwards from the hollow beam member;
   (b) a first arm defining a first side of the bale frame, the first arm comprising a first arm connecting member, the first arm connecting member being telescopically received within the hollow beam member;
   (c) wear strip material positioned between the first arm connecting member and the hollow beam member;
   (d) a second arm defining a second side of the bale frame, the second arm comprising a second arm connecting member, the second arm connecting member being telescopically received within the hollow beam member;
   (e) wear strip material positioned between the second arm connecting member and the hollow beam member;
   (f) a first bale piercing spear connected with the first arm at a first given length therealong and projecting within the bale frame;
   (g) a second bale piercing spear connected with the second arm at a second given length therealong and projecting within the bale frame;
   (h) a first hydraulic cylinder mounted on an exterior surface of the hollow beam member, for controlling telescoping movement between the first arm connecting member and the hollow beam member so that the first bale engaging member and the second bale engaging member are movable toward and away from each other;
   (i) a second hydraulic cylinder mounted on the exterior surface of the hollow beam member, for controlling telescoping movement between the second arm connecting member and the hollow beam member so that the first bale engaging member and the second bale engaging member are movable toward and away from each other; and
   (j) an attachment mechanism for attaching the device to a vehicle such that the bale frame can be raised and lowered;
   wherein the first bale engaging member and the second bale engaging member together comprise a secondary bale support and wherein the secondary bale support is located relative to the primary bale support and said first and second given lengths are selected such that when a bale is positioned within the bale frame a center of gravity of the bale is located between the primary bale support and the secondary bale support and such that when the bale frame is thereafter lifted the bale will be supported by both the primary bale support and the secondary bale support.

2. The device as claimed in claim 1 wherein the attachment mechanism is associated with the support beam.

3. The device as claimed in claim 2 wherein the attachment mechanism is adapted for attachment of the device to a three point hitch.

4. The device as claimed in claim 3 wherein the first bale piercing spear is fixedly connected with the first arm and wherein the second bale piercing spear is fixedly connected with the second arm.

* * * * *